(12) United States Patent
Garman et al.

(10) Patent No.: US 12,744,030 B2
(45) **Date of Patent: *Sep. 22, 2026**

(54) METHOD AND SYSTEM FOR A PARAMETRIC SPEECH SYNTHESIS

(71) Applicant: Georgetown University, Washington, DC (US)

(72) Inventors: Joe Garman, Washington, DC (US); Ophir Frieder, Chevy Chase, MD (US)

(73) Assignee: Georgetown University, Washington, DC (US)

( * ) Notice: Subject to any disclaimer, the term of this patent is extended or adjusted under 35 U.S.C. 154(b) by 56 days.

This patent is subject to a terminal disclaimer.

(21) Appl. No.: 18/675,792

(22) Filed: May 28, 2024

(65) Prior Publication Data

US 2024/0428778 A1 Dec. 26, 2024

Related U.S. Application Data

(63) Continuation of application No. 18/164,782, filed on Feb. 6, 2023, now Pat. No. 12,020,687, which is a (Continued)

(51) Int. Cl.
*G10L 13/10* (2013.01)
*G06F 40/263* (2020.01)
(Continued)

(52) U.S. Cl.
CPC ............ *G10L 13/10* (2013.01); *G06F 40/263* (2020.01); *G06N 3/08* (2013.01); *G10L 13/047* (2013.01); *G10L 13/086* (2013.01)

(58) Field of Classification Search
None
See application file for complete search history.

(56) References Cited

U.S. PATENT DOCUMENTS 6,463,412 B1 * 10/2002 Baumgartner .......... G10L 15/26 704/E15.045
9,484,014 B1 11/2016 Kaszczuk
(Continued)

FOREIGN PATENT DOCUMENTS

CN 107301859 10/2017
EP 1612695 1/2006
(Continued)

OTHER PUBLICATIONS

Jia Y, Zhang Y, Weiss R, Wang Q, Shen J, Ren F, Nguyen P, Pang R, Lopez Moreno I, Wu Y. Transfer learning from speaker verification to multispeaker text-to-speech synthesis. Advances in neural information processing systems. 2018;31. (Year: 2018).*

*Primary Examiner* — Shreyans A Patel
(74) *Attorney, Agent, or Firm* — Smith Gambrell & Russell LLP

(57) ABSTRACT

Embodiments of the present systems and methods may provide techniques for synthesizing speech in any voice in any language in any accent. For example, in an embodiment, a text-to-speech conversion system may comprise a text converter adapted to convert input text to at least one phoneme selected from a plurality of phonemes stored in memory, a machine-learning model storing voice patterns for a plurality of individuals and adapted to receive the at least one phoneme and an identity of a speaker and to generate acoustic features for each phoneme, and a decoder adapted to receive the generated acoustic features and to generate a speech signal simulating a voice of the identified speaker in a language.

15 Claims, 10 Drawing Sheets

Related U.S. Application Data continuation of application No. 17/252,766, filed as application No. PCT/US2019/037294 on Jun. 14, 2019, now Pat. No. 11,605,371.

(60) Provisional application No. 62/822,258, filed on Mar. 22, 2019, provisional application No. 62/686,838, filed on Jun. 19, 2018.

(51) Int. Cl.

| | |
|---|---|
| ***G06N 3/08*** | (2023.01) |
| ***G10L 13/00*** | (2006.01) |
| ***G10L 13/047*** | (2013.01) |
| ***G10L 13/08*** | (2013.01) |

(56) References Cited

U.S. PATENT DOCUMENTS

| | | | | |
|---|---|---|---|---|
| 9,865,253 | B1 * | 1/2018 | De Leon | G10L 25/90 |
| 9,978,359 | B1 | 5/2018 | Kaszczuk | |
| 10,796,686 | B2 * | 10/2020 | Arik | G10L 13/027 |
| 11,605,371 | B2 | 3/2023 | Garman | |
| 12,020,687 | B2 * | 6/2024 | Garman | G06N 3/0442 |
| 2003/0163316 | A1 | 8/2003 | Addison et al. | |
| 2004/0225501 | A1 | 11/2004 | Cutaia | |
| 2007/0168189 | A1 | 7/2007 | Tamura | |
| 2008/0065381 | A1 | 3/2008 | Matsumoto | |
| 2008/0126093 | A1 | 5/2008 | Sivadas | |
| 2008/0201150 | A1 | 8/2008 | Tamura | |
| 2009/0281807 | A1 | 11/2009 | Hirose | |
| 2010/0082329 | A1 * | 4/2010 | Silverman | G10L 15/005 704/8 |
| 2012/0265533 | A1 | 10/2012 | Honeycutt | |
| 2013/0151256 | A1 * | 6/2013 | Nakano | G10L 13/0335 704/268 |
| 2013/0226583 | A1 | 8/2013 | Kadirkamanathan et al. | |
| 2015/0364128 | A1 | 12/2015 | Satoyama et al. | |
| 2016/0372116 | A1 * | 12/2016 | Summerfield | G10L 15/063 |
| 2017/0309272 | A1 | 10/2017 | Vanreusel | |
| 2018/0190269 | A1 | 7/2018 | Lokeswarappa | |
| 2018/0254034 | A1 | 9/2018 | Li | |
| 2018/0336880 | A1 | 11/2018 | Arik | |
| 2021/0256961 | A1 * | 8/2021 | Garman | G10L 13/033 |
| 2024/0420681 | A1 * | 12/2024 | Gupta | G06F 40/58 |

FOREIGN PATENT DOCUMENTS

| | | | | | |
|---|---|---|---|---|---|
| JP | 2006243178 | | | 9/2006 | |
| JP | 2010286608 | A | * | 12/2010 | G10L 21/038 |
| JP | 2011028131 | | | 2/2011 | |
| KR | 101787497 | B1 | * | 10/2017 | G10L 21/038 |

* cited by examiner

Training Mode
200
various speech corpora
202
204
208
210
speech
text
language
speaker
206
216
lexicon
ASR & aligner
212
214
218
phonemes
prosody
230
feature extraction
embed
embed
embed
embed
220
222
224
226
232
228
delay
DRNN deep recurrent neural net
236
234
output
optimizer
-

Fig. 5

IPA Consonants

| Place → / ↓ Manner | Labial | | Coronal | | | | | | Dorsal | | | | | Laryngeal | | |
|---|---|---|---|---|---|---|---|---|---|---|---|---|---|---|---|---|
| | bilabial labio-dental | bilabial labio-dental (soft) | alveolar dental | alveolar dental (soft) | alveolar dental (emphatic) | post-alveolar | post-alveolar (soft) | retroflex | palatal | velar | velar (soft) | velar + | uvular | pharyngeal | epiglottal | glottal |
| nasal | m | mʲ | n | nʲ | | | | ɳ | | ŋ | ŋʲ | | ɴ | | | |
| stop -asp -v | p | pʲ | t | tʲ | tˤ | ʧ | ʧʲ | ʈ | | k | kʲ | | q | | ʡ | ʔ |
| stop -asp +v | b | bʲ | d | dʲ | dˤ | dʒ | dʒʲ | ɖ | | g | gʲ | | ɢ | | | |
| stop +asp -v | pʰ | | tʰ | | | ʧʰ | | ʈʰ | | kʰ | | | | | | |
| stop +asp +v | bʱ | | dʱ | | | dʒʱ | | ɖʱ | | gʱ | | | | | | |
| affricates -v | | | ts | tsʲ | | | | ʈʂ | | | | | | | | |
| affricates +v | | | dz | dzʲ | | | | ɖʐ | | | | | | | | |
| sibilants -v | | | s | sʲ | sˤ | ʃ | ʃʲ | ʂ | | | | | | | | |
| sibilants +v | | | z | zʲ | | ʒ | ʒʲ | ʐ | | | | | | | | |
| non-sibilants -v | f | fʲ | θ | | | | | | hʲ | x | xʲ | ɧ | χ | ħ | ʜ | h |
| non-sibilants +v | v | vʲ | ð | | ðˤ | | | | ɦʲ | ɣ | ɣʲ | | ʁ | ʕ | ʢ | ɦ |
| approximants | ʋ | ʋʲ | ɹ | | | | | ɻ | j | ɰ | | ʍ w | | | | |
| approximant +lateral | | | l | lʲ | | | | ɭ | | ʟ | | ɫ | | | | |
| trill | ʙ | | r | rʲ | | | | ɽ | | | | | ʀ | | | |
| flap/tap | ⱱ | | ɾ | ɾʲ | | | | | | | | | | | | |
| flap/tap +lateral | | | ɺ | | | | | ɭ̆ | | | | | | | | |
| fricative +lateral | | | ɬ ɮ | | | | | | | | | | | | | |

Fig. 6

IPA Vowels

| UNROUND | front | near-front | central | near-back | back |
|---|---|---|---|---|---|
| close | i | | ɨ | | ɯ |
| near-close | | ɪ | ɪ̈ | | |
| close-mid | e | | ɘ | | ɤ |
| mid | | | ə | | |
| open-mid | ɛ | | ɜ | | ʌ |
| near-open | æ | | ɐ | | |
| open | a | | ä | | ɑ |

| ROUND | front | near-front | central | near-back | back |
|---|---|---|---|---|---|
| close | y | | ʉ | | u |
| near-close | | ʏ | ʊ̈ | ʊ | |
| close-mid | ø | | ɵ | | o |
| mid | | | | | |
| open-mid | œ | | ɞ | | ɔ |
| near-open | | | | | |
| open | ɶ | | | | ɒ |

| OTHER | front | near-front | central | near-back | back |
|---|---|---|---|---|---|
| close | ĩ | | | | ũ |
| near-close | | | | | |
| close-mid | ẽ | | | | õ |
| mid | | | ɚ | | |
| open-mid | ɛ̃ | | ɝ | | ɔ̃ |
| near-open | | | ɐ̃ | | |
| open | ã | | | | ɑ̃ |

Example spectrum (line) with spectral envelope (dots)

Figure 9:
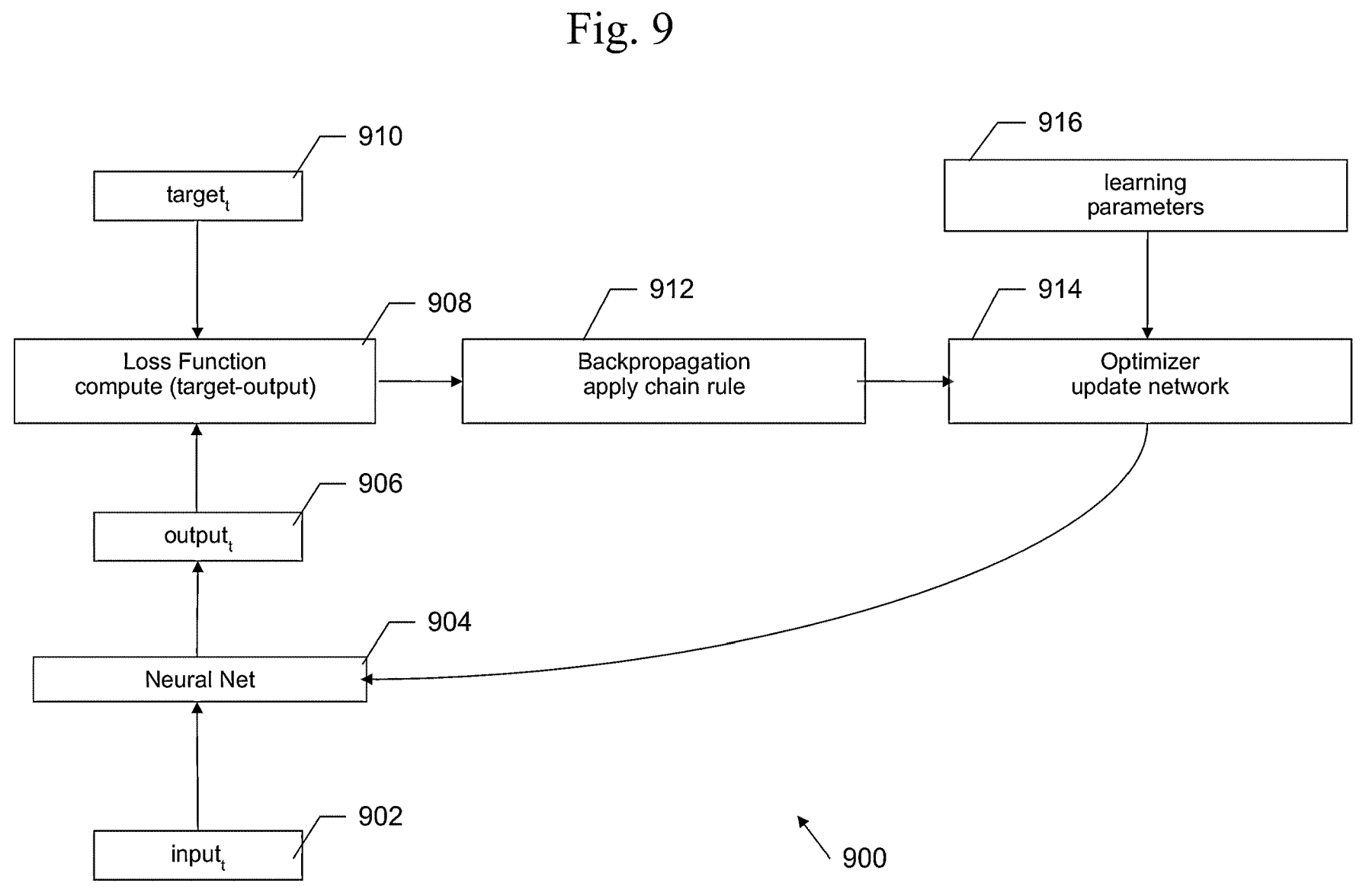

902 $input_t$

904 Neural Net

906 $output_t$

908 Loss Function compute (target-output)

910 $target_t$

912 Backpropagation apply chain rule

914 Optimizer update network 916 learning parameters

METHOD AND SYSTEM FOR A PARAMETRIC SPEECH SYNTHESIS

CROSS-REFERENCE TO RELATED APPLICATIONS

This application is a continuation of U.S. patent application Ser. No. 18/164,782 filed Feb. 6, 2023, which is a continuation of U.S. patent application Ser. No. 17/252,766 filed Dec. 16, 2020 (issued as U.S. Pat. No. 11,605,371 on Mar. 14, 2023), which is a U.S. National Phase of PCT/US2019/037294 filed Jun. 14, 2019, which claimed priority from U.S. Provisional Application No. 62/686,838, filed Jun. 19, 2018, and U.S. Provisional Application No. 62/822,258, filed Mar. 22, 2019, the contents of all of which are hereby incorporated by reference herein in their entirety.

BACKGROUND

The present invention relates to techniques for synthesizing speech in any voice in any language in any accent.

Throughout the long history of speech synthesis, two competing strategies were used: 1) concatenation of pre-recorded subunits, namely concatenative, and 2) parametric analysis of speech and dynamic reconstruction, namely parametric. Concatenative uses actual segments of speech and thus generally produces higher quality speech than parametric speech synthesis. Existing high-end concatenative systems produce speech that is indistinguishable from human speech. Unfortunately, concatenative systems require a large investment in recording speech from a single speaker. Because the actual speech will be reused during synthesis, the recorded speech must be very well controlled. This generally requires well-skilled voice talent and a high-quality recording set-up. Additionally, the produced speech will very closely match the original speech, which is the desired goal. However, this prevents the synthesized voice from being used outside of the domain of the recorded speech, such as speech in a different language.

Unlike concatenative synthesis, parametric speech synthesis can use much less speech to train a new voice, can tolerate minor defects in recording quality, and the resulting voice can be transformed to produce speech in languages other than the recorded language. While still lower quality than concatenative systems, the speech quality of existing parametric systems has continuously improved and is quite usable.

The proliferation of speech output in computer applications has increased the demand for high quality speech synthesis. While speech synthesis in English is quite good, there is a need for speech synthesis in many other languages, and additionally, there is increasing need for "polyglot" systems that can produce speech in multiple languages with the same voice. While it is possible to find voice talent that can speak multiple languages, it is impractical to require a single speaker to speak in all of the languages that a speech synthesis system will produce. There is also a desire for personalized speech synthesis, that is, users want to be able to use their voice for various applications.

Accordingly, a need arises for parametric speech synthesis techniques that may provide speech in multiple languages with the same voice, as well as personalized speech synthesis.

SUMMARY

Embodiments of the present systems and methods may provide techniques for synthesizing speech in any voice in any language in any accent.

For example, in an embodiment, a text-to-speech conversion system may comprise a text converter adapted to convert input text to at least one phoneme selected from a plurality of phonemes stored in memory, a machine-learning model storing voice patterns for a plurality of individuals and adapted to receive the at least one phoneme and an identity of a speaker and to generate acoustic features for each phoneme, and a decoder adapted to receive the generated acoustic features and to generate a speech signal simulating a voice of the identified speaker in a language.

In embodiments, the plurality of phonemes stored in memory may comprise phonemes sufficient to generate speech for a plurality of languages. The machine-learning model may comprise a neural network model. The neural network model may comprise a deep learning neural network model. The text converter may be further adapted to detect a language of the input text to be converted. The language of the input text to be converted may be detected using an n-gram approach. The language of the input text to be converted may likewise be detected by statistical methods, such as, but not limited to, the prevalence of certain function words, for example, "the" in English. The use of other language detection approaches is likewise within the scope of this invention. The generated acoustic features include accent acoustic features and the generated speech signal further simulates a voice of the identified speaker in a language and in an accent. The accent may correspond to a native accent of the identified speaker.

In an embodiment, a method for text-to-speech conversion may be implemented in a computer system comprising a processor, memory accessible by the processor, and computer program instructions stored in the memory and executable by the processor, the method may comprise converting, at the computer system, input text to at least one phoneme selected from a plurality of phonemes stored in memory, storing, in a machine-learning model at the computer system, voice patterns for a plurality of individuals, receiving, at the machine-learning model at the computer system, the at least one phoneme and an identity of a speaker, and generating, with the machine-learning model at the computer system, acoustic features for each phoneme, and receiving, at the computer system, the generated acoustic features and generating, at the computer system, a speech signal simulating a voice of the identified speaker in a language.

BRIEF DESCRIPTION OF THE DRAWINGS

The details of the present invention, both as to its structure and operation, can best be understood by referring to the accompanying drawings, in which like reference numbers and designations refer to like elements.

FIG. 5 is an exemplary illustration of an embodiment of a set of phoneme consonants that may be used by embodiments of the present systems and methods.

FIG. 6 is an exemplary illustration of an embodiment of a set of phoneme vowels that may be used by embodiments of the present systems and methods.

FIG. 9 is an exemplary block diagram of a neural network according to embodiments of the present systems and methods.

DETAILED DESCRIPTION

Embodiments of the present systems and methods may provide techniques for parametric speech synthesis that retain the advantages of previous parametric speech synthesis, but provide greater flexibility of speaker conversion and improved speech quality. Embodiments may provide the capability to impose any particular speaker's voice and speaking manner, on top of any language, using any selected particular accent; that is any voice in any language in any accent. For example, embodiments may provide the capability of having any voice provide text to speech in any language—from a widely spoken language, such as Chinese, to a less used language, such as Swahili, to even an entertainment created language, such as Klingon—with any accent. Additionally, embodiments may be less complicated and easier to use towards building speech synthesis systems for additional languages and speakers than previous systems.

Embodiments of the disclosed systems and methods may, for example, use deep recurrent neural nets (DRNN) to map text to speech. In embodiments, knowledge of speech is distributed throughout the resulting neural net. There is no need to do unit selection because there are no "units" stored in the system; rather the DRNN uses the context of neighboring phonemes to generate the correct output. Additionally, the resulting system contains a single speech model that can be used for any language and speaker.

Figure 1:
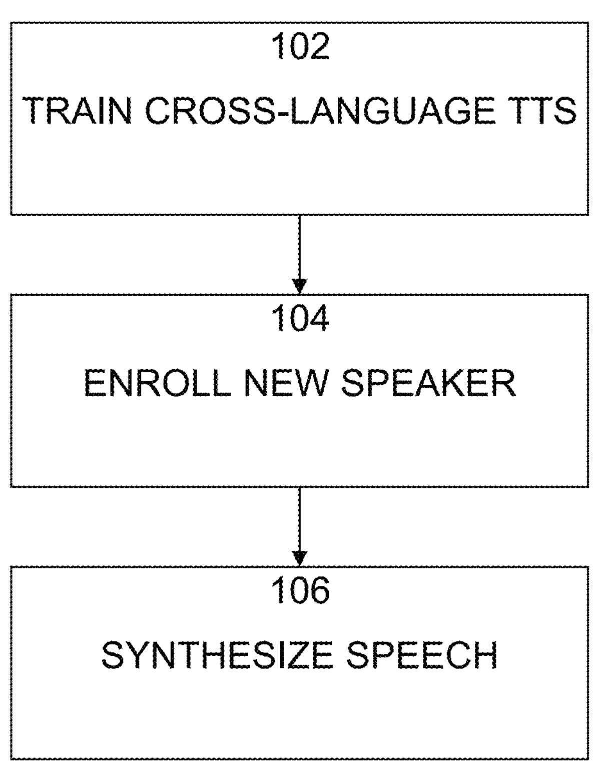
FIG. 1 is an exemplary flow diagram of a process of speech synthesis according to embodiments of the present systems and methods.

An exemplary process 100 of speech synthesis according to embodiments of the present systems and methods is shown in FIG. 1. Process 100 begins with 102, in which the cross-language text-to-speech (TTS) system may be trained. Training 102 may typically be performed by the system builders, language engineers, etc. This process is shown in more detail in FIG. 2. At 104, a new speaker may be enrolled. This process may be performed by an end user and is optional. For example, if the user wants to synthesize their own voice, then the user may enroll a new speaker in the system. However, this is not required, as the user is free to use any of the built-in voices that were trained at 102. At 106, the system may be used to synthesize speech. This process is also typically performed by an end user, or under end user control. Examples of such uses may include presenting voice instructions, reading texts of books, magazines, etc. aloud, etc.

Figure 2:
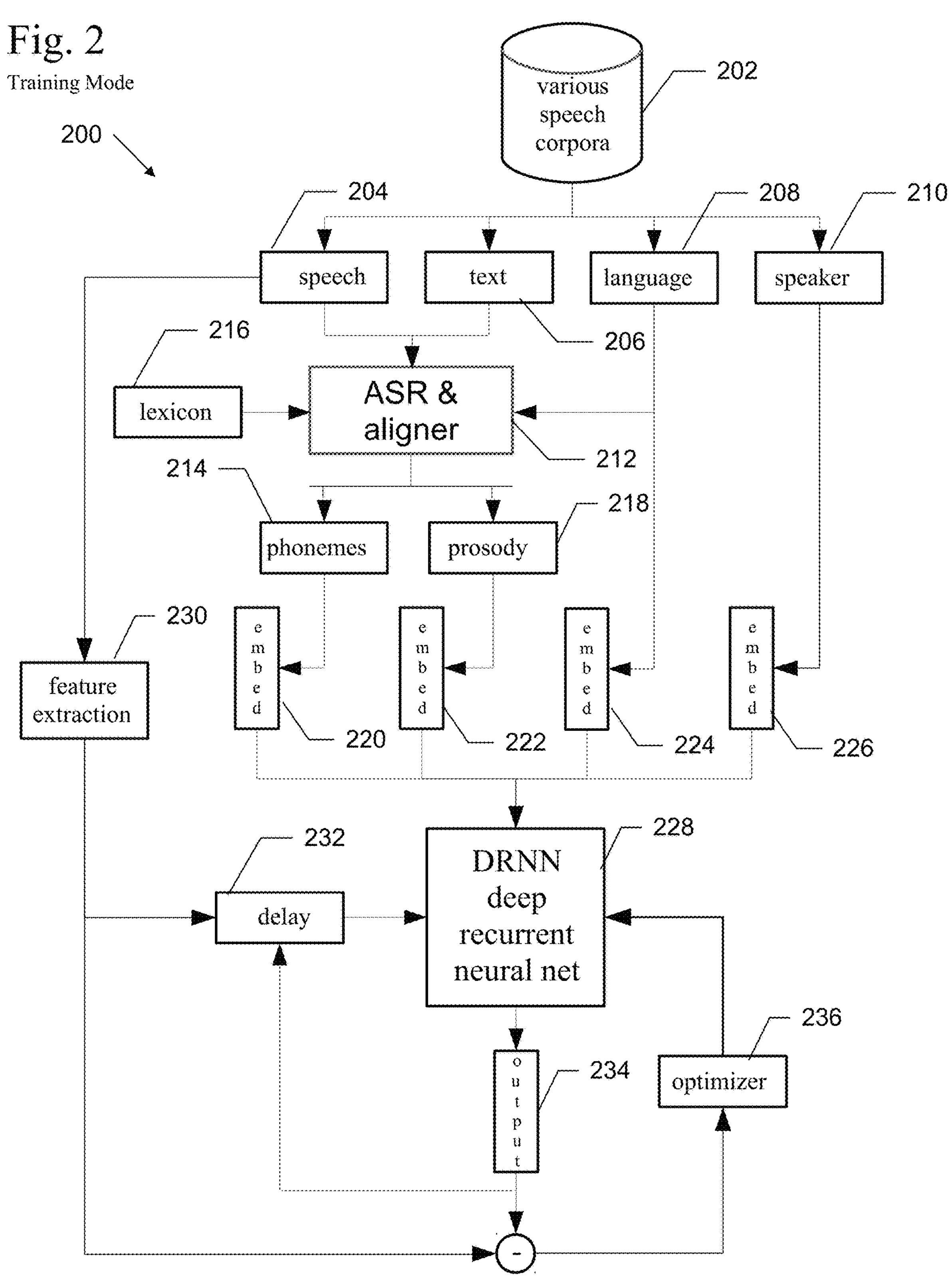
FIG. 2 is an exemplary block diagram of the configuration of embodiments of the system during training.

FIG. 2 is an exemplary block diagram of the configuration of embodiments of the system 200 during training 102. For training, the inputs are speech corpora that contain speech utterances (usually sentences) and corresponding transcripts. For each utterance, the language and speaker are identified. This speech is used to train a DRNN for speech synthesis. The details of the various training components are given below.

Various speech corpora 202 may be used to train the system. Each corpus may contain recordings 204 of a number of utterances spoken by one or more speakers, usually in a single language. For each utterance, there may be a transcript 206 and the language 208 and identity 210 of the speaker may be given. In embodiments, the recordings may be recorded at, for example 48 kHz, and may be down-sampled to 16 kHz as necessary. This recording rate is merely an example, as any recording rate that provides sufficient quality recordings may be used. The corpora may be in various languages, for example, English and Russian, and each language may include numerous speakers, for example, 10 males and 10 females for each language. Additionally, sound tracks from multimedia sources can be used as training medium using speech to text to convert the sound tracks to text and used as input, for example, from movies, talk shows, etc.

Each utterance 204 used for training may be analyzed using a multi-lingual automatic speech recognizer (ASR) 212. ASR 212 may take a speech signal and return a list of phonemes, 1 per frame, where a frame is, for example, 10 msec (100 frames per second). This frame rate is merely an example, as any frame rate that provides sufficient performance may be used. The phoneme set used for ASR 212 is identical to the phoneme set used for speech synthesis. The ASR 212 first converts the speech to MFCC (Mel-Frequency Cepstral Coefficients), a common signal processing process used in speech recognition. The MFCCs are fed into an ASR 212 that attempts to identify the phoneme for each frame. The ASR 212 is trained to correctly identify phonemes. In embodiments, the language 208 for each utterance is presented to the DRNN via embedding, while all other layers are language-independent. This allows the ASR 212 to employ transfer learning from one language to the next, resulting in an ASR 212 that gets more robust with each language that is added. For example, training on 8 different languages may produce an accuracy of about 80% at frame level phoneme identification. In addition to an embedding for each language, there is an embedding for a "universal" language. This "universal" language may be trained with a small percentage of data from all languages, and is useful for doing recognition on an "unknown" language that is not already trained, such as a "new" language.

The output of ASR 212 may be a frame level phonemic transcription, which may contain recognition errors. Using the output of ASR 212, along with the transcript 206 and lexicon 216, a corrected phonemic sequence 214 may be determined. Note that the phonemic sequence is the time alignment of the speech and includes information about the duration of phonemes.

In embodiments, a single phoneme set, for example, based on the International Phonetic Alphabet (IPA), may be used by the system. For every language, a subset of this phoneme set may be used. By basing the phoneme set on IPA, similar phonemes across languages may be encoded with similar symbols. For example, 155 phonemes, plus silence and breath, may be used. This set may be sufficient to cover almost all of the world's languages. FIG. 5 shows consonants, and FIG. 6 shows vowels. In this example, the set was reduced from the set of all possible phonemes by combining similar phonemes that never contrast in any language, for example, dental vs. alveolar stops. In embodiments slight differences in pronunciation owing to language differences may be handled by using language information, as discussed below.

Lexicon 216 may be used to get an accurate phonemic transcript 214 for each utterance. If a lexicon 216 is not available for a language, graphemes, such as letters of text, may be used. For example, a lexicon 216 may be automatically created using a grapheme-to-phoneme conversion along with the postulated phonemic recognition from ASR 212. Additionally, if the phonemic inventory of the language is not known, or is controversial, the output from ASR 212 may be used to help determine the phonemic inventory of the language.

In addition to the phonemes actually used by the system for speech synthesis, the lexicon may contain "meta-phones". Meta-phones may be used to encode allophones. For instance, English /t/ can be pronounced as /t, $t^h$, $t^i$, ɾ, ʔ, d/; and although some of these pronunciations are limited by context, the actual manifestation of a given /t/ cannot be known for sure until it is encountered in speech. Meta-phones allow the system to remain agnostic about the realization of a given phoneme until ASR 212 resolves it.

Prosody refers to elements of speech that are not encoded in phonemes. In embodiments, the variables of prosody used by the system may include, for example, pitch, duration, and loudness. For each of these, the prosodic value may be relative to an average or predictable value for that variable. For example, vowels may usually be longer and louder than consonants—that is average and predictable. A vowel that is longer or louder than expected may be prosodically salient. Duration is already encoded in the frame-level phoneme sequence. Pitch and loudness may be encoded in a prosody block 218 and 318, shown in FIGS. 2 and 3, respectively. The values for these variables may be extracted from lexicon 216, for example, tone in Mandarin, or from the transcript, for example, question intonation in English. Additionally, features derived from ASR 212 may be used to determine non-orthographic prosodic cues, for example, a focus word in a sentence. These ASR 212 derived prosodic elements may also be used to train the text conversion used during synthesis; this is not shown in FIG. 2.

Embedding is a method of dimensionality reduction widely used with neural nets. In embodiments, the dimensionality reduction used may be modest and not the goal. However, it is within the scope of the present systems and methods to use embedding. While the dimensionality reduction is useful, the purpose for using embedding may be to better allow sharing of information across similar but different elements. With embedding, each input item may be replaced by a vector of values. Accordingly, phonemes 214 may be embedded in feature vector 220, while prosody 218 may be embedded in feature vector 222. For example, if 20 is used as the dimension for phoneme embedding, then the phoneme /t/ may be replaced with a 20-value feature vector. In this way, the 157 phonemes (155 plus silence and breath) may be converted to 20 values. This may produce a dimensionality reduction of 157 to 20. In this example, a 157×20 table may be needed to perform this embedding. In embodiments, the features may be learned as part of training and the embedding table may likewise be learned as part of training. Adding another phoneme to the system may involve adding one row to the embedding table, and training it. Because similar phonemes may have similar feature values, for example, /d/ and /t/, embodiments may learn common shared attributes and then learn the difference.

Language 208 may be uniquely identified using, for example, an IETF language tag, such as those listed in the BCP 47 document series. For example, en-US represents US English. Mutually intelligible languages that differ significantly in pronunciation are considered distinct languages, e.g., en-GB represents English spoken in Great Britain. As far as the system is concerned, en-US and en-GB are completely unrelated. Likewise, each speaker 210 has a unique identifier that may, for example, be derived from the name of the corpus that contains them and the identifier within that corpus.

Languages and speakers may be embedded similarly to phonemes 214 and prosody 218. Each language may be replaced by a language feature vector 224, and each speaker may be replaced by a speaker feature vector 226. These feature vectors may also be learned as part of training. For example, if the system also uses dimensionality of 20 for these embeddings, then each speaker is encoded as a 20-value vector. These 20 values may reflect the difference between this speaker and the average speaker and may be sufficient for the system to reproduce the speaker's voice. Like with phonemes, similar speakers may have similar features, for example, males and females will form two separate clusters. Likewise, language embedding may allow the system to learn common shared phonemes, and then learn the differences from this average for each language. Adding a speaker or language to the system may be simply a matter of adding one row to the embedding table and learning the feature vector for the new speaker or language. The data requirement for this may be relatively small. The system may, for example, learn a speaker with as little as 20 minutes of speech. Likewise, learning a new language requires relatively little data, as long as there are no novel phonemes in the language.

By using embedding in this way, DRNN 228 may find an optimal balance between factorization and adaptation. Consequently, embodiments may produce a single universal speech model, and employ language and speaker feature vectors to reproduce any speaker speaking any language. Note specifically that the use of other neural networks models besides DRNN is likewise within scope of this invention, as well as, in addition, to the use of other machine learning approaches.

Every utterance used for training may be encoded using a feature extraction function 230. For example, feature extraction 230 may convert a speech signal, for example, 16 bit/16 khz pcm signal, into acoustic features. The acoustic features are those features that may be used to reconstruct a recognizable, although not identical, representation of the input speech. The acoustic features may include a) a spectral envelope, which may be the spectrum of the signal after the harmonics are removed, b) a frequency component termed F0, which may be the fundamental frequency (pitch) of voiced segments, or an indicator that the segment is unvoiced, and there is no fundamental frequency for unvoiced segments, and c) a frequency component termed Fw and an amplitude component termed Aw, which may be the cut-in frequency and amplitude of white noise or non-voiced audio energy. This is relevant in phonemes that are voiced but also have extensive non-voiced energy, e.g. /v/ and /z/ (voiced fricatives). Without taking this into consideration, voiced fricatives may sound "buzzy". Typically, the fundamental frequency F0 is about 100 Hz for male voices and about 200 Hz for female voices. The results of feature extraction 230 may include a set of acoustic features that DRNN 228 may try to match.

Figure 7:
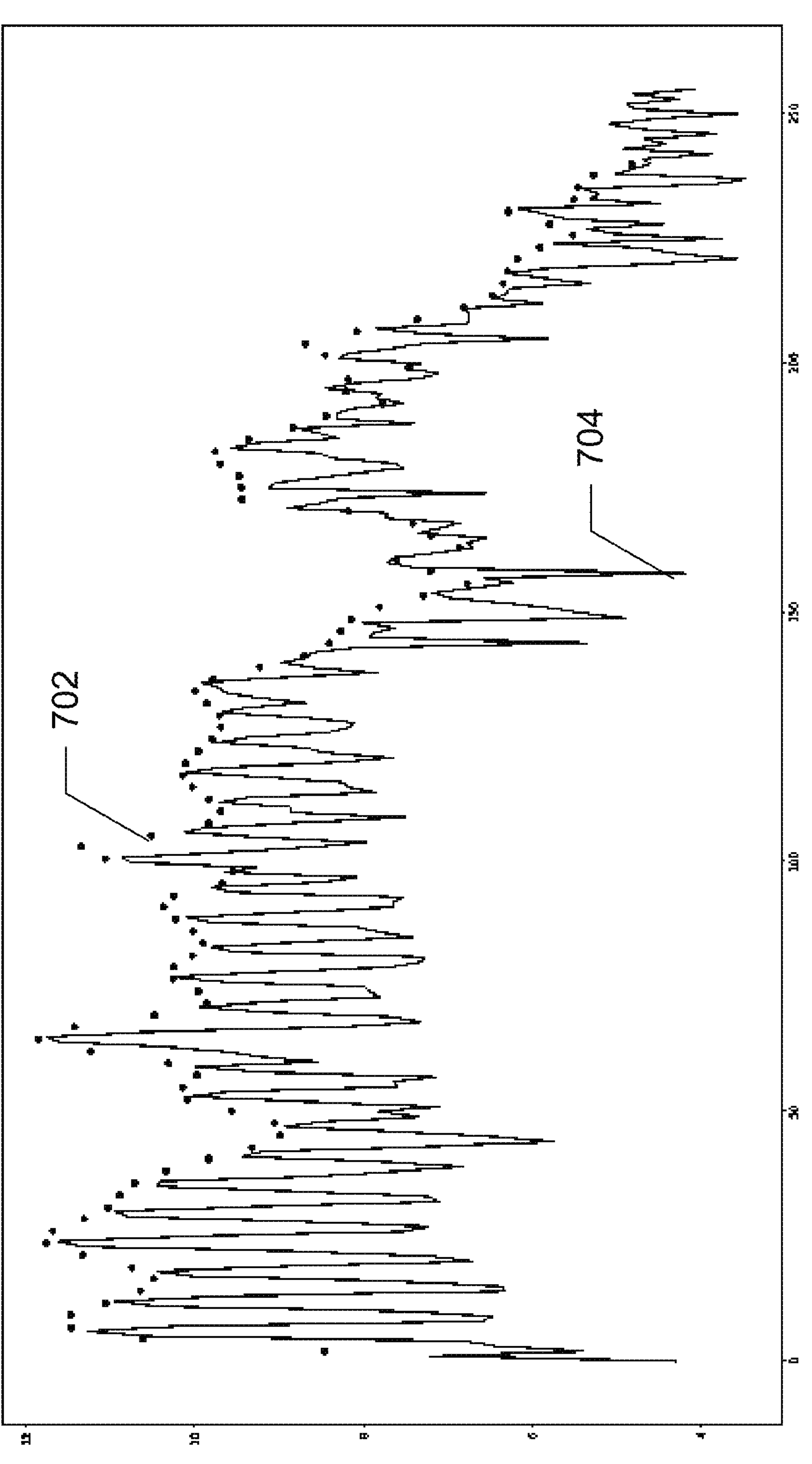
FIG. 7 is an exemplary illustration of spectral envelope of speech.

An example of a spectral envelope is shown in FIG. 7. The spectral envelope 702 is a series of points forming a curve representing the energy at each frequency in the spectrum. For voiced segments, as seen in FIG. 7, the peaks of the harmonics represent the energy. The valleys 704 between the peaks may be ignored. The harmonics are separated by the fundamental frequency, F0. Changes in fundamental frequency may affect the separation of the peaks, but may not affect the overall envelope. The dots in FIG. 7 represent the points on the spectral envelope 702 that are returned by feature extraction 230 and that DRNN 228 will try to match. To prevent the muffled quality common to parametric synthesizers, embodiments may employ two strategies: 1) spectral enhancement, and 2) focal enhancement. With spectral enhancement, the spectral envelope 702 undergoes peak enhancement which raises peaks and lowers troughs in the spectrum; this helps compensate for smearing in the spectral dimension. With focal enhancement, the system emphasizes the difference between neighboring frames and helps prevent smearing in the time dimension.

Along with the spectral envelope, the pitch and excitation manner may be used to reconstruct the speech signal. The pitch is determined using a pitch tracker. For each frame, the excitation manner is the degree to which the frame is voiced or unvoiced. Voiced fricatives, e.g. /z/, may have periodic excitation at low frequencies, but aperiodic excitation at high frequencies. Distinguishing these frames from normal voiced frames may greatly reduce the buzzy sound common to parametric synthesizers.

DRNN 228 may take a sequence of embedded phonemes 220, prosodic values 222, language identifiers 224, and speaker identifiers 226 as input, as described above. Additionally, the acoustic features 230 may also be used as input, after, for example, some time delay 232. By including the acoustic features 230 as input, DRNN 228 may learn the transition from one frame to the next. This is an easier task, and also reduces or eliminates problems associated with recording differences across corpora 202.

The output of DRNN 228 may be a set of acoustic features 234, as described above. DRNN 228 may be language independent. When trained, DRNN 228 may be a single universal speech model and may encode all the information necessary to produce speech for all of the trained languages and speakers. The system learns, in the sense of "deep learning", the phonemes for the various languages, as well as the voice characteristics of each of the speakers. The resulting DRNN 228 may be a single model of speech that contains all of the phonemes and prosodic patterns for each of the languages and the voice characteristics of each of the included speakers. This speech model may be deployed to hardware in various scenarios, for example, burnt to ROM or installed on a smart phone.

One skilled in the art will likewise understand that there are many categories of learning systems and many variations within each category. For example, focusing on neural networks, these networks include but are not limited to DRNN, as exemplified herein, deep convolutional networks (DCN), extreme learning machine (ELM), deep believe networks (DBN), and transformers, just to name a few. Thus, it is within the scope of present systems and methods to use any appropriate learning system.

For each frame, the output 234 of DRNN 228 may be compared with the features 230 extracted from speech for that frame. The difference between the actual features and the DRNN produced features may be used to update DRNN 228 via optimizer 236.

Figure 8:
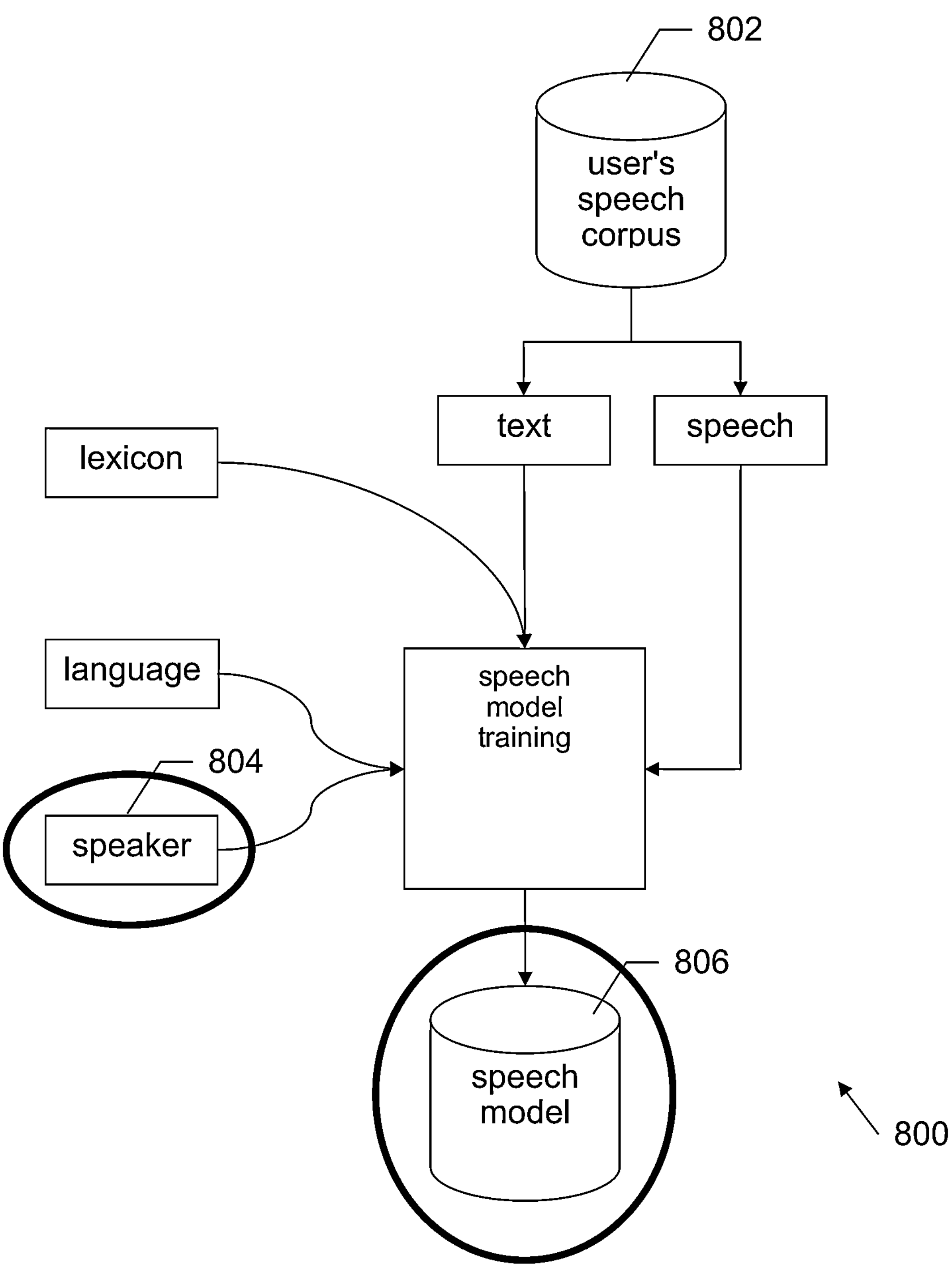
FIG. 8 is an exemplary block diagram of the configuration of embodiments of the system during speaker enrollment.

Turning now to FIG. 8, an exemplary block diagram of the configuration of embodiments of the system 800 during speaker enrollment 104 is shown. In this process, the end-user can optionally add his or her voice to the inventory of speakers. To add a voice, the user may read and record a series of prompts in his or her native or fluent language, for example, English, to form user speech corpus 802. System 800 may then learn the speaker's voice characteristics and the new voice 804 may be added to the inventory of speakers. When a speaker enrolls, a new row may be added to the embedding table, which characterizes the new speaker relative to the other enrolled speakers. Additionally, this new voice 804 may be transferred to other devices. For example, the speaker's mother might want to have this voice read emails. No previous information in the speech model 806 need be changed. The information needed to add the new speaker to a system is encapsulated in the new voice information 804. The movie industry may, for example, use this approach to maintain the voice of the actors when dubbing films in foreign languages.

Figure 3:
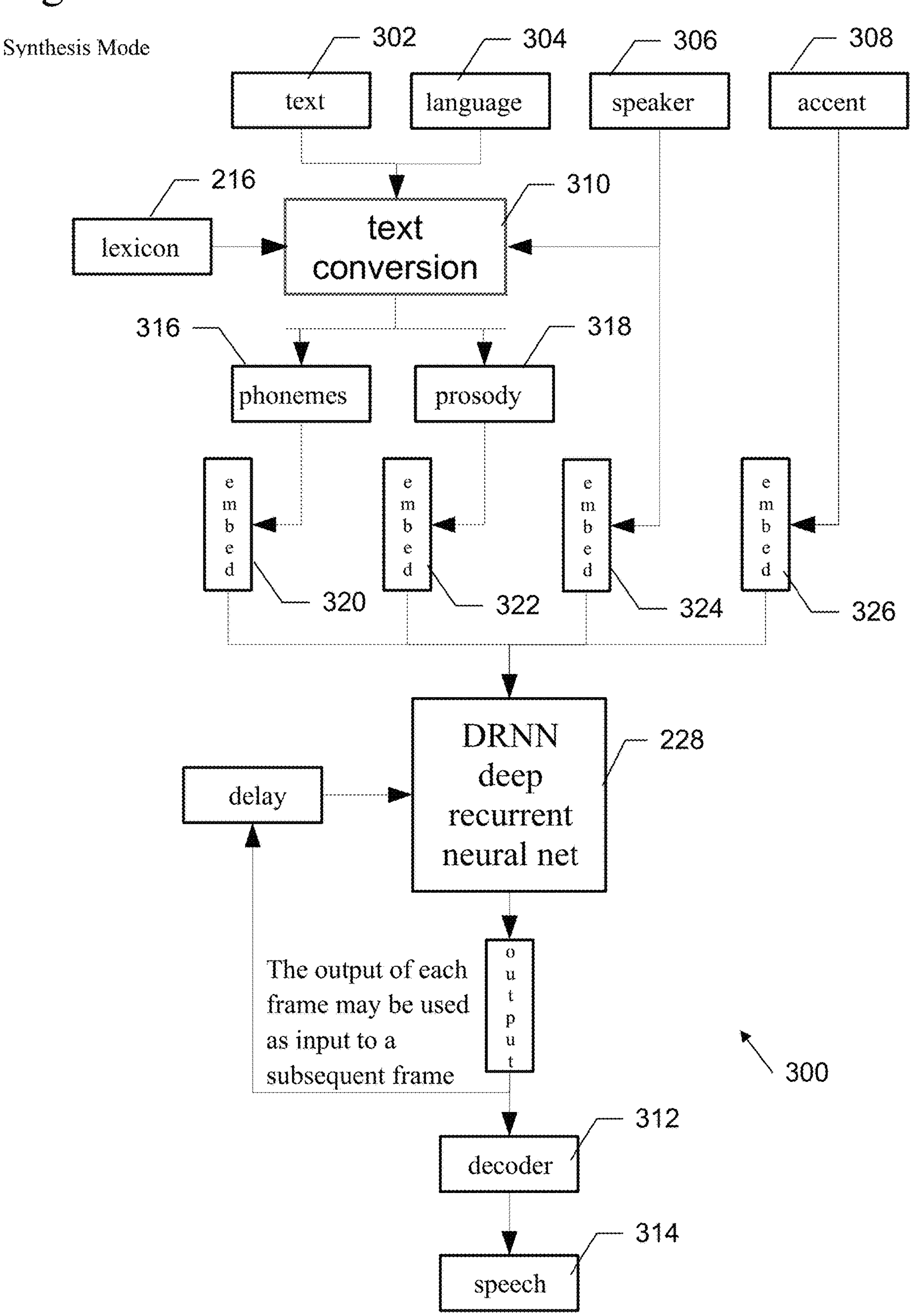
FIG. 3 is an exemplary block diagram of the configuration of embodiments of the system during speech synthesis.

Turning now to FIG. 3, an exemplary block diagram of the configuration of embodiments of the system 300 during speech synthesis 106 is shown. For synthesis, the inputs may include: the text to be spoken 302, the language of the text 304, identification of the speaker 306, and the output accent 308 (which may be the same as the language of the text). The supplied text may be from any source and may contain metadata, such as Speech Synthesis Markup Language (SSML). The language of the text may be identified, either automatically detected or manually specified. For example, the language of the text may be automatically identified using an n-gram approach. An n-gram is a contiguous sequence of n items from a given sample of text or speech. The items can be phonemes, syllables, letters, words, or base pairs according to the application. The n-grams typically are collected from a text or speech corpus. By allowing the selection of the speaker, language, and accent, the embodiments may produce speech using any speaker, in any language, with any accent.

Many of the components of system 300 are similar to those shown in FIG. 2. In embodiments, differences may include text conversion block 310 instead of ASR & aligner 212, the output of each frame may be used as input to a later frame after some time delay, and the output goes to a decoder 312 to produce speech.

Figure 4:
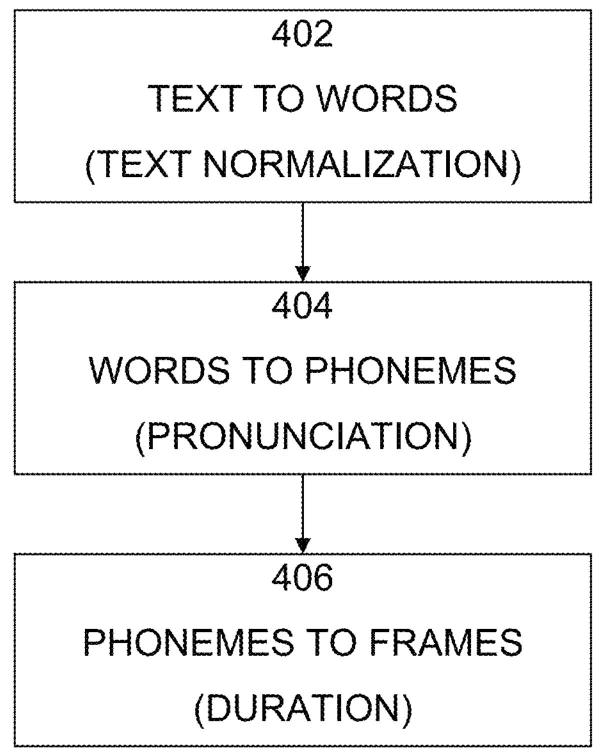
FIG. 4 is an exemplary flow diagram of a process of text conversion according to embodiments of the present systems and methods.

In operation, input text 302 and language identifier 304 for the text may be input to text converter 310. Speaker identification 306 may also play a role in producing the correct output. The output from text converter 310 may be a frame-level sequence of phonemes 316 and prosodic elements 318. The conversion from text may be accomplished in three steps, as shown in FIG. 4: text to words 402, words to phonemes 404, and phonemes to frames 406.

The process of text normalization converts text to words 402. Text normalization can be tricky, e.g. "½" can be "one half" or "January second" or "February first". Existing text normalization techniques may be used for this step. It is likewise within the scope of this invention to rely on any known information retrieval term processing techniques as described, for example but not limited to, in D. Grossman and O. Frieder, *Information Retrieval: Algorithms and Heuristics*, Springer Publishers 2004.

Once the words are determined by text normalization 402, the pronunciation for each word may be determined 404. The text may be converted to a series of phonemes with appropriate suprasegmental information, for example, tones in Mandarin or intonation in English, using the text language.

An optional language specific lexicon can be used to improve the quality of the speech. The same lexicon 216 from training may be used to find possible pronunciations. A grapheme-to-phoneme process may be employed to create pronunciations for words that are missing from the lexicon. For words with ambiguous pronunciations, the most likely pronunciation may be selected based on the context of the word and previous training. Ambiguous pronunciations may be encoded with meta-phones, for example, liaison in French, or final consonant devoicing in German. The use of meta-phones may greatly simplify the lexicon. However, some alternate pronunciations may not be conveniently encoded with meta-phones. For example, February can be "feb-ya-wary" or "feb-ra-wary" or "feb-yu-ary" or "feb-ru-ary". For these cases, lexicon 216 may have multiple entries, and the most likely pronunciation given the language 304, speaker 306, and accent 308 may be chosen.

Finally, the duration of each phoneme, in frames, may be determined 406. For this step, speaker 306 may be used, as speech rate varies between speakers. For a "fast" speaker, phonemes will have, on average, shorter duration. Note also that phoneme duration varies between languages. The text conversion system may handle this interaction of speaker and language to produce a speech rate that is consistent with both the speaker and language. In addition to duration, the other prosodic elements, pitch, and loudness, are also postulated during text conversion.

A speaker may be chosen. This may be a built-in speaker or an enrolled speaker. An output language may be chosen. This may be the language of the text or some other language. Typically, the language of the text may be chosen, producing accent-free speech in the target language. However, if desired, any accent can be introduced intentionally. The series of phonemes may be converted to speech using the output language and the selected speaker's voice characteristics. For each frame, DRNN 228 may produce the most likely acoustic features for the current phoneme 316 for the chosen speaker 306 and accent 308, in the current context of phonemes. These acoustic features may be used as input to a later frame after some time delay. DRNN may be the network that was trained during the training process, shown in FIG. 2. The inputs for the phonemes 316, accents 308, and speakers 306 may be fed into an Embedding layer to generated embeddings 320, 324, 326. The prosodic inputs may be fed into an Embedding Bag layer to generate embeddings 322. These inputs may include, but are not limited to, stress, tone, focus, syllable position, punctuation type, part-of-speech.

The output of DRNN 228 for each frame represents the acoustic features of speech for that frame. Decoder 312 may take the acoustic features and generate a speech signal. An excitation signal may be generated using F0 and Fw/Aw; then the excitation signal may be convolved with the spectral envelope to produce a speech signal. Some conventional vocoders may use LPC (Linear Prediction Coefficients) and an IIF (Infinite Impulse Filter). However, in embodiments, the convolution may be performed using Fast Fourier Transforms (FFTs) and inverse-FFTs. For a non-limiting example, the FFT of the time-domain excitation signal may be computed, the frequency-domain FFT results may be convolved (multiplied) with the spectral envelope, then an IFFT may be performed on the convolution results to form a speech signal. Examples of software routines that may perform such computations may include numpy.fft.rfft( ) and numpy-.fft.irfft( ) The use of FFTs and IFFTs has the advantage that the spectra are encoded as actual spectra and results in simpler manipulation and few, if any, spectral artifacts. By using high frequency aperiodic noise, represented by Fw and Aw, to generate the excitation signal, speech may be synthesized without the buzzy quality common to parametric synthesizers. Another problem common to parametric synthesizers is a muffled quality that results from over-smoothing of acoustic features. The use of acoustic enhancement during feature extraction 230 and DRNN 228 to estimate those features during synthesis may help reduce this problem, resulting in high quality speech. The output speech 314 may be played immediately or saved for later use.

Embodiments of the present systems and methods may provide text-to-speech conversion in any voice in any language in any accent. Using deep learning, the disclosed approach imitates any speaker's voice speaking in any language using any accent independent of the speaker's ability to pronounce the sounds of a given language or to speak the particular language in any desired accent.

An exemplary block diagram of an embodiment of a neural network 900, such as a DRNN, is shown in FIG. 9. It is best viewed in conjunction with FIG. 2. In this example, during training, acoustic features extracted during feature extraction 230, as well features such as phonemes 214 and prosody information 218, may be input 902 to neural network model 904. Neural network model 904 may try to match the input features and may output 906 its match attempt.

Loss function 908 may accept output 906 and target 910 and determine an error or loss between the desired target 910 and the current attempt 906 by neural network model 904 to match target 910. Examples of loss functions that may be used include, but are not limited to, mean square error, Cross Entropy Loss, and Binary Cross Entropy. In embodiments, a mean square error loss function may be used to determine matching errors between points on the spectral envelope. Cross Entropy Loss may be used to determine matching between categories, rather than particular values. In embodiments, Mean Square Error may be used to determine an error in matching F0, with unvoiced frames being ignored. In this example, the use of categories and Cross Entropy Loss for working with those categories may provide improved results compared to other loss functions. Binary Cross Entropy may be used for determinations where there are multiple categories, such as multiple yes/no decisions.

The determined error from loss function 908 may be input to backpropagation block 912, which may compute gradients that are needed by optimizer 914 for the calculation of updates to the weights used by neural network model 904. Optimizer 914 then, using learning parameters 916, may calculate updates to the weights used by neural network model 904 to improve the accuracy of the model. In embodiments, optimizers such as, but not limited to, Stochastic Gradient Descent (SGD), Root Mean Square Propagation (RMSprop), and Adaptive Moment Estimation (ADAM) may be used.

Additional neural network layer building blocks that may be used to implement embodiments of the present systems and methods may include, but are not limited to, Linear units, Gated Recurrent Units (GRUs), Embedding, and Embedding Bag. Linear units are fully-connected neural network layers that apply linear transformations to the incoming data. For example, a linear unit may have a number of inputs n and a number of outputs m, and may contain (n+1)*m parameters, including bias parameters. Gated Recurrent Units are neural network layers that apply a gating mechanism, which may be dependent on hidden states and biases, to the incoming data. GRUs have some similarities to Long Short-Term Memory (LSTM) units, but may provide improved performance in embodiments of the present systems and methods. Embedding layers are typically similar to simple lookup tables that store embeddings of a fixed dictionary and size. Embedding functions may accept one input and may generate one or more outputs. Given two instances of input data that share some similarities, such embedding may generate vectors that maintain the similarities. For example, as shown in FIG. 2, phonemes may be embedded 220. In embodiments, the embedding may be performed so that similar phonemes may generate similar embedding vectors. Likewise, the differences between the phonemes may also be reflected in the embedding vectors. Embedding bag layers are similar to embedding layers, but may accept zero or more inputs and may generate one or more outputs. Embedding bag functions may compute, for example, sums or means of several embedding vectors. In embodiments, embedding bag functions may be used with prosodic elements 218, while embedding functions may be used with phonemes 214, languages 208, and speaker elements 210.

In addition to the neural network layers above, non-linear layers may be used between the above-mentioned layers. In embodiments of the present systems and methods, non-linear layers that may be used may include Rectified Linear Units (ReLU), Exponential Linear Units (ELU), and Leaky Rectified Linear Units (Leaky ReLU). Rectified Linear Units are linear neural network layers that have an activation function defined as the positive part of its argument (for example, y=x if x≥0, y=0 otherwise). ReLUs provide a rectification function on the input data. Exponential linear units provide an exponential function rather than a pure rectification function (for example, y=x if x≥0, $y=a(e^x-1)$ otherwise). Leaky Rectified Linear Units are linear neural network layers that allow a small, positive gradient when the unit is not active (for example, y=x if x≥0, y=0.01x otherwise).

Embodiments of the present systems and methods may utilize deep recurrent neural networks (DRNN). In embodiments, GRU-blocks may provide the power of recurrent neural networks (RNN) with greatly reducing processing time. The use of GRU-blocks may speed up both training and generation. For example, using GRU-blocks, embodiments using a graphics processor for non-graphics processing, such as a GTX 1070, may train more than 80 hours of speech in less than 2 hours and may generate speech at more than 100× faster than real time.

Embodiments may utilize a universal phonetic transcription system sufficient to encode any language to allow sharing phonetic information across languages. For example, metaphones may support language specific lexicons with universal phonetic transcriptions to provide fast and accurate allophonic determination and language independent phonetic transcriptions.

Embodiments may utilize compact language and speaker embedding that shares phonetic knowledge. For example, in embodiments, only 20 minutes of speech may be required to enroll a new speaker and only 4 hours of speech may be required to train a new language. Such embodiments may utilize very memory efficient representations of languages. For example, in embodiments, the system may train 8 languages with than more 200 speakers using only 5.6 GB of memory, which easily fits on, for example, a GTX 1070. Examples of such efficient training are shown in Table 1:

TABLE 1

| Language | speech (hours) | speakers |
|---|---|---|
| Mandarin | 9 | 49 |
| English | 9-US<br>10-Indian | 5-US<br>4-Indian |
| Spanish | 7 | 80 |
| Finnish | 4 | 1 |
| Hindi | 7 | 2 |
| Romanian | 20 | 16 |
| Telugu | 8 | 2 |
| Turkish | 11 | 119 |
| total | 85 | 278 |

The Analysis of Speech. There are two ways to approach the analysis of speech: from a production or acoustic approach. The production approach may include features such as: 1) Phones—the distinct speech sounds critical to the meaning of words, 2) Coarticulation—the manner in which phones combine, 3) Prosody resulting from linguistic features, such as lexical stress or question pitch contour, and 4) Prosody resulting from extra-linguistic features, such as tone of voice or word focus. The acoustic may include features such as: 1) Spectrum (timbre and voicing), 2) Power (stress), 3) Duration (tempo and rhythm), and 4) F0 (pitch).

Each of the elements of the production system contribute to each of the elements of the acoustic system. Embodiments may utilize both of these perspectives to create a robust system. By taking the four elements of the production approach and the four elements of the acoustic approach, embodiments may utilize a 4×4 matrix of 16 components, which may be capable of accurately synthesizing the full range of human speech.

Table 2 below details the relative importance of each component on the final quality of synthesized speech. While every production element contributes to every acoustic element, the contributions are not equal, for example, phones provide the greatest contribution to the spectrum, but relatively little to F0, as shown in Table 2.

TABLE 2

| Acoustic & Production Component Matrix | | Production Approach | | | |
|---|---|---|---|---|---|
| | | phones | coarticulation | linguistic prosody | extra-linguistic prosody |
| Acoustic Approach | spectrum (timbre & voicing) | high | high | low | low |
| | power (stress) | high | medium | medium | medium |
| | duration (tempo & rhythm) | medium | medium | high | high |
| | F0 (pitch) | low | medium | high | high |

Figure 10:
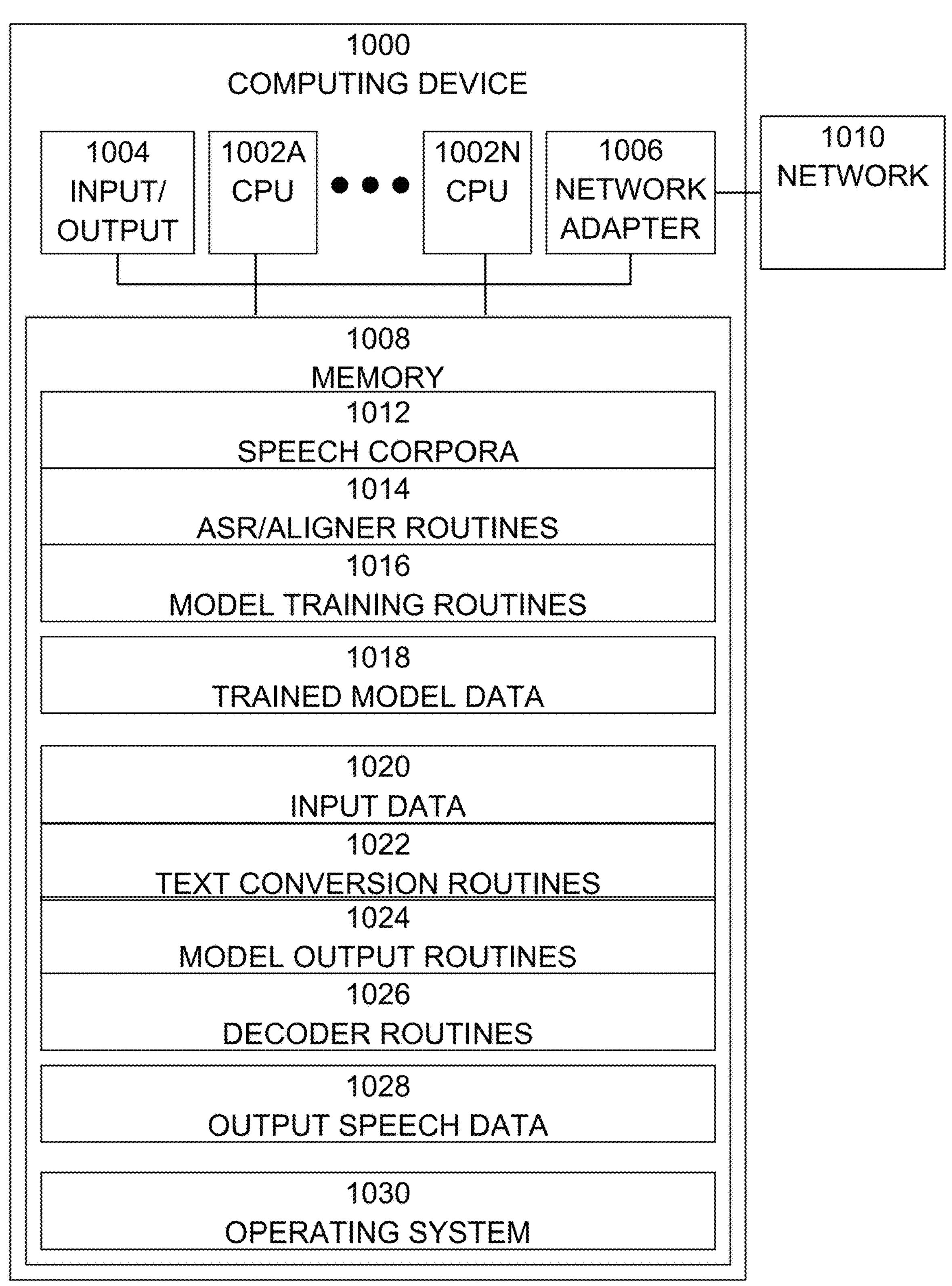
FIG. 10 is an exemplary block diagram of a computer system in which embodiments of the present systems and methods may be implemented.

An exemplary block diagram of a computer device/system 1000, in which processes involved in the embodiments described herein may be implemented, is shown in FIG. 10. Computer system 1000 may be implemented using one or more programmed general-purpose computer systems, such as embedded processors, systems on a chip, personal computers, workstations, server systems, and minicomputers or mainframe computers, or in distributed, networked computing environments. Computer system 1000 may include one or more processors (CPUs) 1002A-1002N, input/output circuitry 1004, network adapter 1006, and memory 1008. CPUs 1002A-1002N execute program instructions in order to carry out the functions of the present communications systems and methods. Typically, CPUs 1002A-1002N are one or more microprocessors, such as an INTEL CORE® processor. FIG. 10 illustrates an embodiment in which computer system 1000 is implemented as a single multi-processor computer system, in which multiple processors 1002A-1002N share system resources, such as memory 1008, input/output circuitry 1004, and network adapter 1006. However, the present communications systems and methods also include embodiments in which computer system 1000 is implemented as a plurality of networked computer systems, which may be single-processor computer systems, multi-processor computer systems, or a mix thereof.

Input/output circuitry 1004 provides the capability to input data to, or output data from, computer system 1000. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 1006 interfaces computing device 1000 with a network 1010. Network 1010 may be any public or proprietary LAN or WAN, including, but not limited to the Internet.

Memory 1008 stores program instructions that are executed by, and data that are used and processed by, CPUs 1002A to 1002N to perform the functions of computer system 1000. Memory 1008 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 1008 may vary depending upon the function that computer system 1000 is programmed to perform. In the example shown in FIG. 10, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 10, exemplary memory contents are shown for both a training system and a speech synthesis system. While in some cases, these may both be implemented in the same computer system, typically, they are implemented in different computer systems. For example, the training system may typically be implemented in a server system or systems, while the speech synthesis system may typically be implemented in an end user device, such as a smartphone, tablet, personal computer, etc.

The present systems and method may be implemented using any suitable programming language or environment. For example, any of numerous programming environments, examples of which include, but are not limited to, PyTorch, TensorFlow, MATLAB, etc. may be used. Likewise, any of numerous programming languages, examples of which include, but are not limited to, such as Python, Ruby, C, C++, CUDA, etc., may be used.

In the example shown in FIG. 10, memory 1008 may include speech corpora 1012, ASR/aligner routines 1014, model training routines 1016, trained model data 1018, input data 1020, text conversion routines 1022, model output routines 1024, decoder routines 1026, output speech data 1028, and operating system 1030. Typically, a training system may include speech corpora 1012, ASR/aligner routines 1014, model training routines 1016, trained model data 1018, and operating system 1030, while a speech synthesis system may include trained model data 1018, input data 1020, text conversion routines 1022, model output routines 1024, decoder routines 1026, and operating system 1030. For clarity, FIG. 10 shows only an exemplary selection of components of the systems shown in FIGS. 2 and 3. All of the elements shown in FIGS. 2 and 3 may, in fact, be present in their respective systems.

Speech corpora 1012 may include data that contain speech utterances, such as sentences, and corresponding transcripts. Each corpus may typically be in one language. ASR/aligner routines 1014 may include software routines to analyze utterances from speech corpora 1012 using a multilingual automatic speech recognizer (ASR). Model training routines 1016 may include software routines to train the model using, for example, a sequence of embedded phonemes, prosodic values, language identifiers, and speaker identifiers as input, along with acoustic features, to generate trained model data 1018. Input data 1020 may include data such as input text and language identifiers for the text, as well as speaker identification, etc. Text conversion routines 1022 may include software routines to convert the input text to, for example, a frame-level sequence of phonemes and prosodic elements. Model output routines may include software routines to generate the most likely acoustic features for the current phoneme for the chosen speaker and language using trained model data 1018. Decoder routines 1026 may include software routines to take the acoustic features and construct a speech signal to form output speech data 1028. Output speech data may be played immediately or saved for later use. Operating system 1030 may provide overall system functionality.

As shown in FIG. 10, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including iOS, Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

We claim:

1. A speech conversion system comprising;

a memory for storing a plurality of phonemes;

a text converter adapted to convert input text to at least one phoneme selected from the plurality of phonemes stored in the memory, wherein the text converter is further adapted to detect a language of the input text;

a machine-learning model storing voice patterns for a plurality of individuals and adapted to receive the at least one phoneme from the text converter and an identity of a speaker and to generate and enhance acoustic features for each of the at least one phoneme, wherein the machine-learning model comprises a deep learning neural network that uses (i) phoneme embedding, (ii) speaker embedding, and (iii) language embedding, and wherein the voice patterns comprise a plurality of production components and a plurality of acoustic components arranged in a matrix, each of the plurality of production components contributing a selected amount to each of the acoustic components, such that the selected amount contributed is present in the matrix for each pair of production component and acoustic component, and wherein the enhanced acoustic features comprise at least one of spectral enhancement or focal enhancement; and a decoder adapted to receive the generated acoustic features from the machine-learning model and to generate a speech signal simulating a voice of the identified speaker in the language, wherein the generated acoustic features include accent acoustic features such that the generated speech signal further simulates the voice of the identified speaker in the language and in an accent.

2. The system of claim 1, wherein the at least one phenome comprises a phoneme of the International Phonetic Alphabet and silence and breath.

3. The system of claim 1, wherein the machine-learning model comprises a neural network model.

4. The system of claim 1, wherein spectral enhancement comprises increasing a peak of a spectral envelope or decreasing a trough of the spectral envelope and focal enhancement comprises emphasizing the difference between a first frame and a second frame.

5. The system of claim 1, wherein the generated acoustic features include accent acoustic features and the generated speech signal further simulates a voice of the identified speaker in a language and in an accent.

6. The system of claim 5, wherein the accent corresponds to a native accent of the identified speaker.

7. The system of claim 1, wherein the plurality of production components comprise phones, coarticulation, prosody from linguistic features, and prosody from extralinguistic features, and the plurality of acoustic components comprise spectrum, power, duration, and pitch.

8. A speech conversion method implemented in a computer system comprising a processor, memory accessible by the processor, and computer program instructions stored in the memory and executable by the processor, the method comprising:

storing a plurality of phonemes in the memory;

converting input text to at least one phoneme selected from the plurality of phonemes stored in the memory;

detecting a language of the input text;

storing, in a machine-learning model at the computer system, voice patterns for a plurality of individuals, receiving, at the machine-learning model at the computer system, the at least one phoneme and an identity of a speaker, and generating and enhancing, with the machine-learning model at the computer system, acoustic features for each of the at least one phoneme, wherein the machine-learning model comprises a deep learning neural network that uses (i) phoneme embedding, (ii) speaker embedding, and (iii) language embedding, and wherein the voice patterns comprise a plurality of production components and a plurality of acoustic components arranged in a matrix, each of the plurality of production components contributing a selected amount to each of the acoustic components, such that the selected amount contributed is present in the matrix for each pair of production component and acoustic component, and wherein enhancing acoustic features comprises at least one of spectral enhancement or focal enhancement; and receiving, at the computer system, the generated acoustic features from the machine learning model, and generating, at the computer system, a speech signal simulating a voice of the identified speaker in the language, wherein the generated acoustic features include accent acoustic features such that the generated speech signal further simulates the voice of the identified speaker in the language and in an accent.

9. The method of claim 8, wherein the at least one phenome comprises a phoneme of the International Phonetic Alphabet and silence and breath.

10. The method of claim 8, wherein the machine-learning model comprises a neural network model.

11. The method of claim 8, wherein spectral enhancement comprises increasing a peak of a spectral envelope or decreasing a trough of the spectral envelope and focal enhancement comprises emphasizing the difference between a first frame and a second frame.

12. The method of claim 8, wherein the generated acoustic features include accent acoustic features and the generated speech signal further simulates a voice of the identified speaker in a language and in an accent.

13. The method of claim 12, wherein the accent corresponds to a native accent of the identified speaker.

14. The method of claim 8, wherein the plurality of production components comprise phones, coarticulation, prosody from linguistic features, and prosody from extralinguistic features, and the plurality of acoustic components comprise spectrum, power, duration, and pitch.

15. A speech conversion system comprising;

a memory for storing a plurality of phonemes;

a text converter adapted to convert input text to at least one phoneme selected from the plurality of phonemes stored in the memory, wherein the text converter is further adapted to detect a language of the input text;

a machine-learning model storing voice patterns for a plurality of individuals and adapted to receive the at least one phoneme from the text converter and an identity of a speaker and to generate and enhance acoustic features for each of the at least one phoneme, wherein the machine-learning model comprises a deep learning neural network that uses (i) phoneme embedding, (ii) speaker embedding, and (iii) language embedding, wherein the voice patterns comprise a plurality of production components and a plurality of acoustic components arranged in a matrix, each of the plurality of production components contributing a selected amount to each of the acoustic components, such that the selected amount contributed is present in the matrix for each pair of production component and acoustic component, and having voice pattern options, and wherein the enhanced acoustic features comprise at least one of spectral enhancement or focal enhancement; and a decoder adapted to receive the generated acoustic features from the machine-learning model and to generate a speech signal simulating a voice of the identified speaker in the language, wherein the generated acoustic features include accent acoustic features such that the generated speech signal further simulates the voice of the identified speaker in the language and in an accent.

* * * * *